United States Patent
Harper et al.

[11] 3,917,384
[45] Nov. 4, 1975

[54] HIGH RESOLUTION LENSES FOR OPTICAL WAVEGUIDES

[75] Inventors: John S. Harper, Carmel; Eric G. Lean, Mahopac; Eberhard A. Spiller, Mt. Kisco; Janusz S. Wilczynski, Ossining, all of N.Y.

[73] Assignee: International Business Machines Corporation, Armonk, N.Y.

[22] Filed: Sept. 11, 1973

[21] Appl. No.: 396,156

[52] U.S. Cl. .................... 350/96 WG; 350/175 R
[51] Int. Cl.² ............................................ G02B 5/14
[58] Field of Search ............................... 350/96 WG

[56] References Cited
UNITED STATES PATENTS

| | | |
|---|---|---|
| 3,614,198 | 10/1971 | Martin et al. ................ 350/96 WG |
| 3,743,962 | 7/1973 | Rosenberg................. 350/96 WG X |
| 3,774,987 | 11/1973 | Boivin .......................... 350/96 WG |

OTHER PUBLICATIONS

Righini et al., "Geodesic Lenses for Guided Optical Waves" *Applied Optics* Vol. 12, No. 7, July 1973, pp. 1477–1481.

*Primary Examiner*—John K. Corbin
*Attorney, Agent, or Firm*—Sughrue, Rothwell, Mion, Zinn and Macpeak

[57] ABSTRACT

A spherical depression lens is formed in a spherical depression in the substrate of the waveguide and a waveguide index lens is formed over the depression lens whereby the combination of the two lenses provides a high resolution waveguide lens for optical waveguides.

2 Claims, 8 Drawing Figures

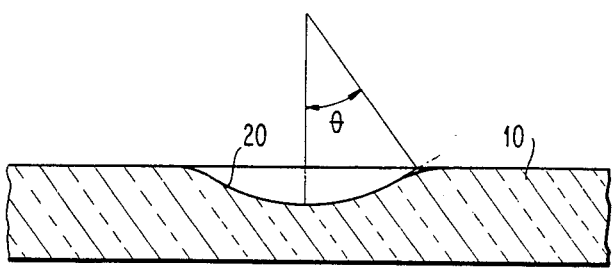
FIG. 1
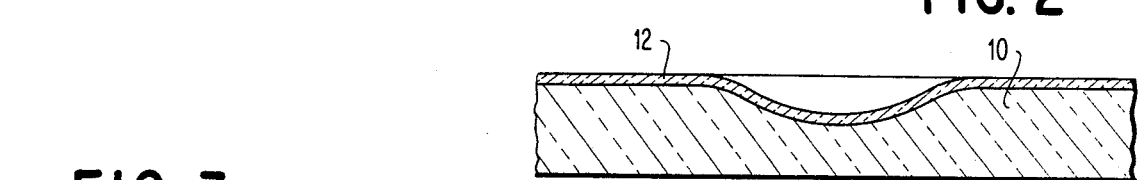
FIG. 2
FIG. 3
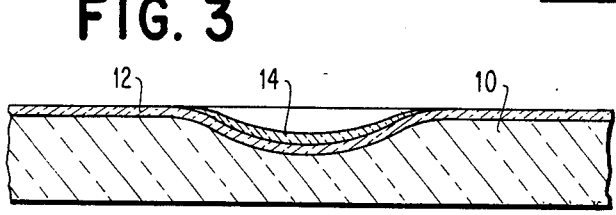
FIG. 4
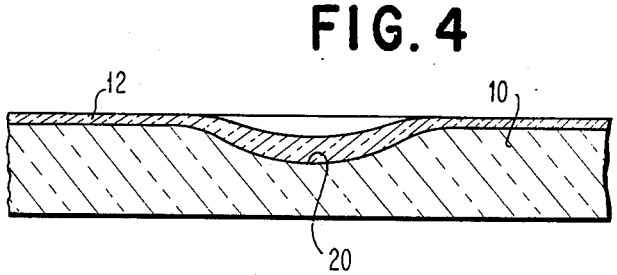
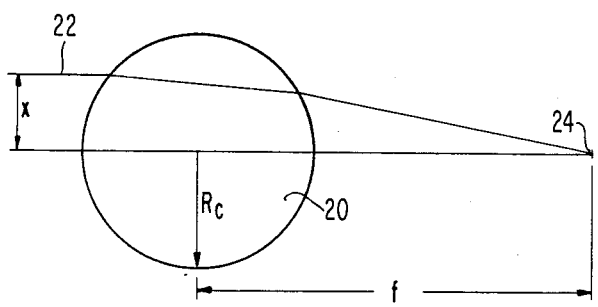
FIG. 5
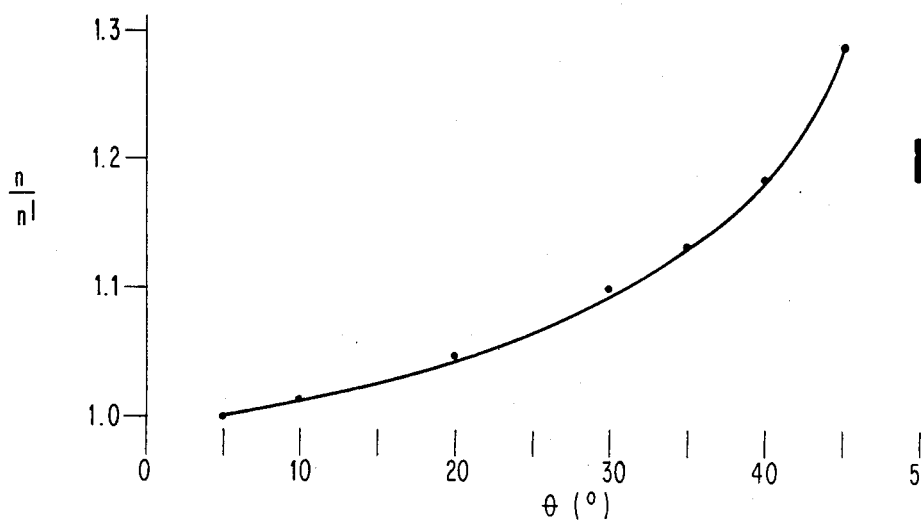
FIG. 6

HIGH RESOLUTION LENSES FOR OPTICAL WAVEGUIDES

BACKGROUND OF THE INVENTION

1. Field of the Invention

The present invention is directed to integrated optics and more specifically to a high resolution lens for optical waveguides.

2. Prior Art

The focusing of a light beam in optical waveguides is one of the main problems in the application of integrated optics. It has been proposed to produce focusing elements by incorporating areas into the waveguide film which have a different waveguide index than the rest of the film. A change in the waveguide index can be obtained by modifying the thickness or the refractive index of the film or by overcoating the film with another material. The drawback for this proposal is that the obtainable change of the waveguide index is very small and high resolution lenses cannot be produced.

It is also possible to obtain focusing by forming a depression or protrusion in the surface of the substrate of the optical waveguide. This kind of focusing element has been proposed for acoustic surface waves and the resolution of such a lens is comparable to that obtainable with "waveguide index lenses."

In optics it is well known that the spot size is dependent upon the numerical aperture and a large numerical aperture will result in a small spot size. However, it has proven to be impossible to utilize a large numerical aperture with a simple spherical depression or protrusion on a substrate of the waveguide since the focal length for the lens thus formed will increase as the distance of the light from the center of the lens increases. Therefore, due to the aberration of this type of lens, high resolution lenses cannot be produced this way.

The waveguide index of a mode is defined by the phase velocity of light in vacuum divided by the phase velocity of light propagating in a waveguide mode. The waveguide index of a waveguide mode depends on the optical constants of the waveguide as well as the optical constants of the surrounding materials. It also depends on the thickness of the waveguide and is different for different modes.

Therefore, many parameters are available to change the waveguide index of a waveguide mode; examples are a change in the thickness of the waveguide, a change of the index of the waveguide, an overcoat of the waveguide with a material of different index of refraction, a change in the index of refraction of the substrate or any combination of these changes. A conversion from one mode to another is another possibility for obtaining a different waveguide index.

SUMMARY OF THE INVENTION

The present invention provides a high resolution lens which is suitable for optical waveguides in integrated optics.

The present invention provides a high resolution lens which is a combination of the spherical depression lens and a waveguide index lens whereby the aberrations of the depression lens are compensated by the aberrations of the waveguide index lens.

The present invention provides a high resolution optical lens which can be incorporated into a waveguide and comprises a surface depression lens in combination with a waveguide index lens. The surface depression lens is in the form of a portion of the waveguide conforming to a spherical depression in the substrate of the waveguide and the waveguide index lens is superposed on the depression lens.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 1 is an elevation in section of an optical waveguide substrate having a spherical depression formed therein.

FIG. 2 is a view similar to FIG. 1 with a uniform optical waveguide coating deposited over the substrate including the spherical depression to form the depression lens.

FIG. 3 is a view similar to FIG. 2 with a second optical coating disposed on the first optical coating only in the area of the spherical depression lens to form a combination spherical depression-waveguide index lens.

FIG. 4 is a view similar to FIG. 3 showing a modification wherein the first optical coating is thicker in the area of the spherical depression to form a combination spherical depression-waveguide index lens.

FIG. 5 is a schematic view showing the convergence of a light beam passing through a spherical depression lens.

FIG. 6 is a graph showing the ratio of the waveguide indices for best compensation plotted against the angle for the spherical depression lens.

DETAILED DESCRIPTION OF THE INVENTION

FIGS. 1 and 5 show the geometry of the surface depression lens according to the present invention wherein the depression 20 formed in the substrate 10 of the waveguide intersects the surface of the substrate in a circle of radius $R_c$ and has an included angle of $\theta°$ between a radius of the sphere perpendicular to the substrate and the radius of the sphere terminating at the lip of the depression 20. As best seen in FIG. 1, the lip of the depression is rounded off so there will not be any sharp transitional edge between the upper surface of the substrate and the surface of the depression. The dimple or depression 20 may be formed in the substrate by grinding and subsequent polishing or other suitable method.

Figure 7:
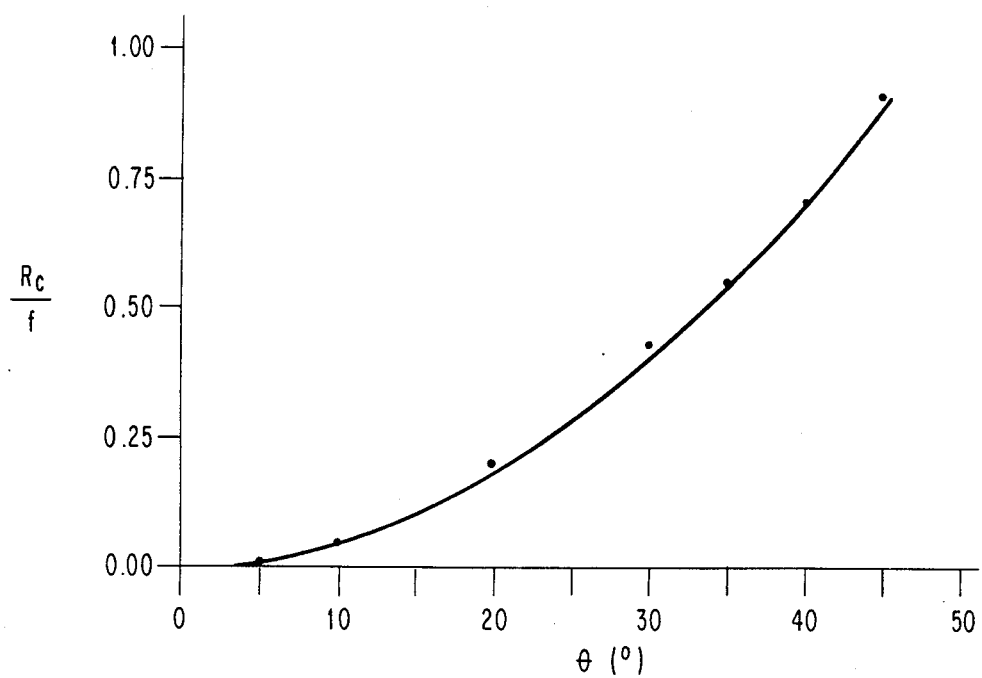
FIG. 7 is a graph showing the ratio of the radius of the spherical depression lens to the focal length of the best combination of this depression lens with a waveguide index lens plotted as a function of the angle of the spherical depression lens.

A uniform waveguide coating 12 is provided on the surface of the substrate in any suitable manner, for example, sputtering, evaporation, etc. and on the surface of the depression as best seen in FIG. 2. The index of refraction of the coating 12 must be different than the index of refraction of the substrate. For non-leaky waveguides, the index must be greater than that of the substrate. As shown in FIG. 3, a second coating 14 having a higher index of refraction than the first coating 12 is then applied to the area of the depression to provide a waveguide index lens and the edges of the second coating are feathered to present a smooth transition between the surfaces of the first and second coatings. It should be understood that the coating 14 could just as effectively be applied under the coating 12. Also, the waveguide index lens need not cover the entire depression and may have various shapes depending upon the particular effect desired. As an alternative to this method, the first coating 12 which is applied to the substrate 10 in FIG. 4 is made substantially thicker within the area of the depression 20 than on the surface of the substrate. The thicker portion has a different waveguide index and thus forms a waveguide index lens in combination with a depression lens. The waveguide index is $n'$ outside the depression and $n$ inside. In FIG. 6 the ratio $n/n'$ for best compensation is plotted as a function of the angle $\theta$ and in FIG. 7 the ratio of the surface radius of the depression $R_c$ to the focal length of the best combination is plotted as a function of the angle $\theta$.

A spherical protrusion lens is the full equivalent of a spherical depression lens and, as used in this specification and the appended claims, spherical depression lens is hereby defined as including both a depression lens and a protrusion lens.

As an example, a device could be made up as follows:

| Element | Material | Approx. Index |
| --- | --- | --- |
| Substrate 10 | Fused quartz | 1.46 |
| Waveguide film 12 | Corning glass - Type 7059 | 1.57 |
| Lens 14 | Zinc Sulfide (ZnS) or Tantalum Oxide ($Ta_2O_5$) | 2.2 |

Figure 8:
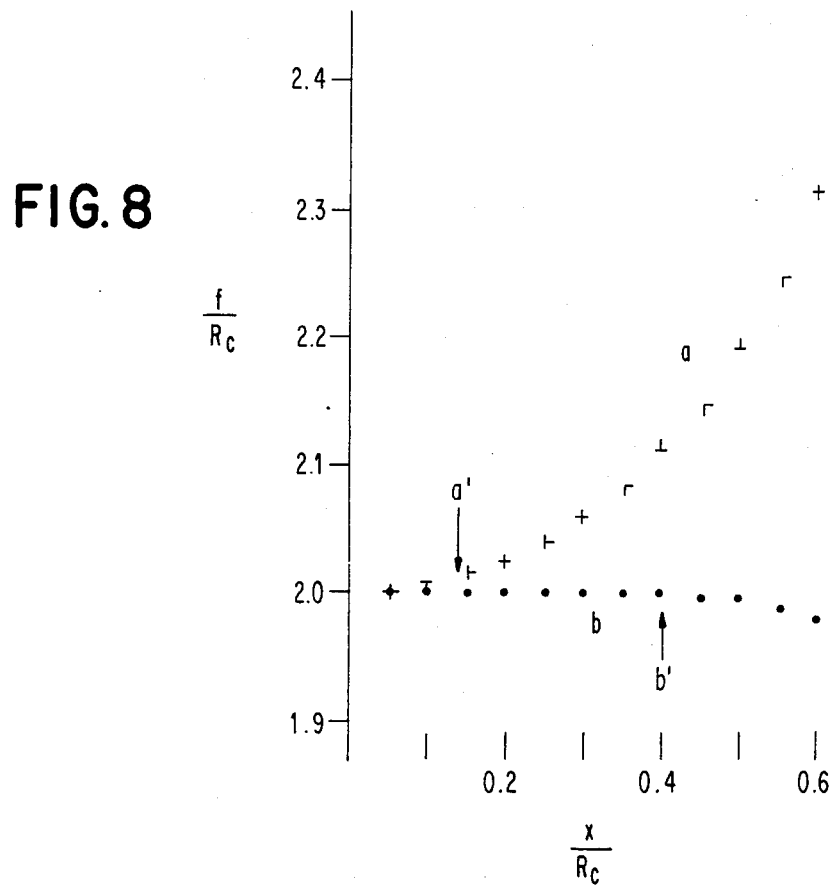
FIG. 8 is a graph showing the aberrations of a simple spherical depression lens at ($a$) and the aberrations of the proposed lens at ($b$).

In FIG. 8 the curve (a) shows for example with $f=2R_c$ how the ratio of the focal length of a simple depression to the surface radius of the depression will increase as the ratio of the width of the input beam to the surface radius of the depression. This variation in the focal length will result in a blurred spot. Curve (b) in FIG. 8 shows, again with $f=2R_c$, how the ratio of the focal length to the surface radius of depression remains substantially constant for the combination lens of the present invention as the ratio of the beam width to the surface radius of the depression increases. If we choose a dimple or depression radius $R_c$ equal to 1cm with a focal length of 2cm, this will require an angle of $\theta$ equal to 41.41° for the simple depression lens. However, with the combination lens according to the present invention, the same radius $R_c$ and focal length will require an angle $\theta$ equal to 32.8° and a ratio of $n/n'$ equal to 1.1205. The apertures for the two lenses which give the smallest spot size for light of wavelength 8,500A and $n'$ = 1.5 are marked in FIG. 8 by the arrows $a'$ and $b'$ for respective curves (a) and (b). We see that the combination lens according to the present invention (curve b) has a much larger usable aperture than the simple depression lens (curve a). Another important fact is that the required change in the waveguide index is very small and the small difference in the index of the waveguide required for best performance will facilitate the mode conversion problem considerably.

The individual performances of a depression lens, a waveguide index lens and an optimum combination, all of focal length $f=2$cm and radius $R_c=1$cm are compared in the top half of Table 1. The data for each element of the combination are given in the bottom half of Table 1. This comparison further illustrates the improvement obtained by the combination lens over the simple depression lens.

TABLE 1

|  | n/n | θ | f(cm) | Optimum width of input beam 2X(cm) | Smallest spot size(μ) |
| --- | --- | --- | --- | --- | --- |
| Depression Lens | 1 | 41.41 | 2 | 0.28 | 8.3 |
| Waveguide Index Lens | 1.335 | 0 | 2 | 0.26 | 8.4 |
| Combination | 1.1205 | 32.80 | 2 | 0.8 | 2.9 |
| Element 1 Depression Lens | 1 | 32.8° | 3.14 | 0.30 | 12.1μ |
| Element 2 Waveguide Index lens | 1.1205 | 0 | 4.15 | 0.31 | 16.8μ |

Thus the combination lens according to the present invention provides a much higher degree of resolution for optical waveguides than either the previous depression lens or previous waveguide index lens alone.

While the invention has been particularly shown and described with reference to a preferred embodiment thereof, it will be understood by those skilled in the art that various changes in form and details may be made therein without departing from the spirit and scope of the invention. For example, there are other ways of changing the waveguide index in the region of the depression lens, such as by ion exchange or radiation damage.

What is claimed is:
1. An optical waveguide device comprising:
an optical waveguide substrate having a first index of refraction and having a spherical depression in one surface thereof,
an optical waveguide having a second, higher index of refraction disposed on said substrate including said depression to form a spherical depression lens, and
a layer disposed over said depression lens and having an index of refraction greater than said second index of refraction whereby a combination spherical depression-waveguide index lens provides compensation for lens aberrations.
2. A method of making an optical waveguide device including a high resolution lens comprising the steps of:

providing a substrate having a given index of refraction and having a spherical depression at the lens location, forming a uniform thickness waveguide layer on said substrate, including said depression, said waveguide layer having an index of refraction higher than that of said substrate, and forming a layer of material having a still higher index of refraction on said waveguide layer at said depression.

* * * * *